(12) United States Patent
Tyan

(10) Patent No.: US 10,144,454 B1
(45) Date of Patent: Dec. 4, 2018

(54) THIRTY-SIX CORNERED VEHICLE BEAM

(71) Applicant: Ford Global Technologies, LLC, Dearborn, MI (US)

(72) Inventor: Tau Tyan, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/671,544

(22) Filed: Aug. 8, 2017

(51) Int. Cl.
| | |
|---|---|
| *B60N 99/00* | (2006.01) |
| *B62D 21/15* | (2006.01) |
| *B62D 29/00* | (2006.01) |
| *B21D 47/01* | (2006.01) |
| *B21D 53/88* | (2006.01) |

(52) U.S. Cl.
CPC ............. *B62D 21/15* (2013.01); *B21D 47/01* (2013.01); *B21D 53/88* (2013.01); *B62D 29/008* (2013.01)

(58) Field of Classification Search
CPC ...... B62D 21/15; B62D 29/008; B21D 47/01; B21D 53/88
See application file for complete search history.

(56) References Cited

U.S. PATENT DOCUMENTS

| | | | | |
|---|---|---|---|---|
| 4,991,291 | A  * | 2/1991 | Koepke | ............. H01L 21/67121 |
| | | | | 174/538 |
| 8,459,726 | B2 | 6/2013 | Tyan et al. | |
| 8,539,737 | B2 | 9/2013 | Tyan et al. | |
| 8,641,129 | B2 | 2/2014 | Tyan et al. | |
| 9,073,582 | B2 | 7/2015 | Tyan et al. | |
| 9,126,628 | B2 | 9/2015 | Tyan et al. | |
| 9,174,678 | B2 | 11/2015 | Tyan et al. | |
| 9,187,127 | B2 | 11/2015 | Tyan et al. | |

* cited by examiner

*Primary Examiner* — Lori L Lyjak
(74) *Attorney, Agent, or Firm* — Jason Rogers; Brooks Kushman, P.C.

(57) ABSTRACT

A vehicle frame is disclosed. The vehicle frame may include an extruded metal hollow columnar beam defining in cross section, four interconnected arms, each having nine sidewalls and a bulbous free end, arranged to form a cross with thirty-six corners, and configured to dissipate axial compression loads via deformation of the thirty-six sidewalls and the thirty-six corners.

20 Claims, 8 Drawing Sheets

$S_j$: length of side j
$T_j$: thickness of side j $\theta i_1$ - $\theta i_{24}$ internal angle j
$\theta e_1$ - $\theta e_{12}$ external angle j

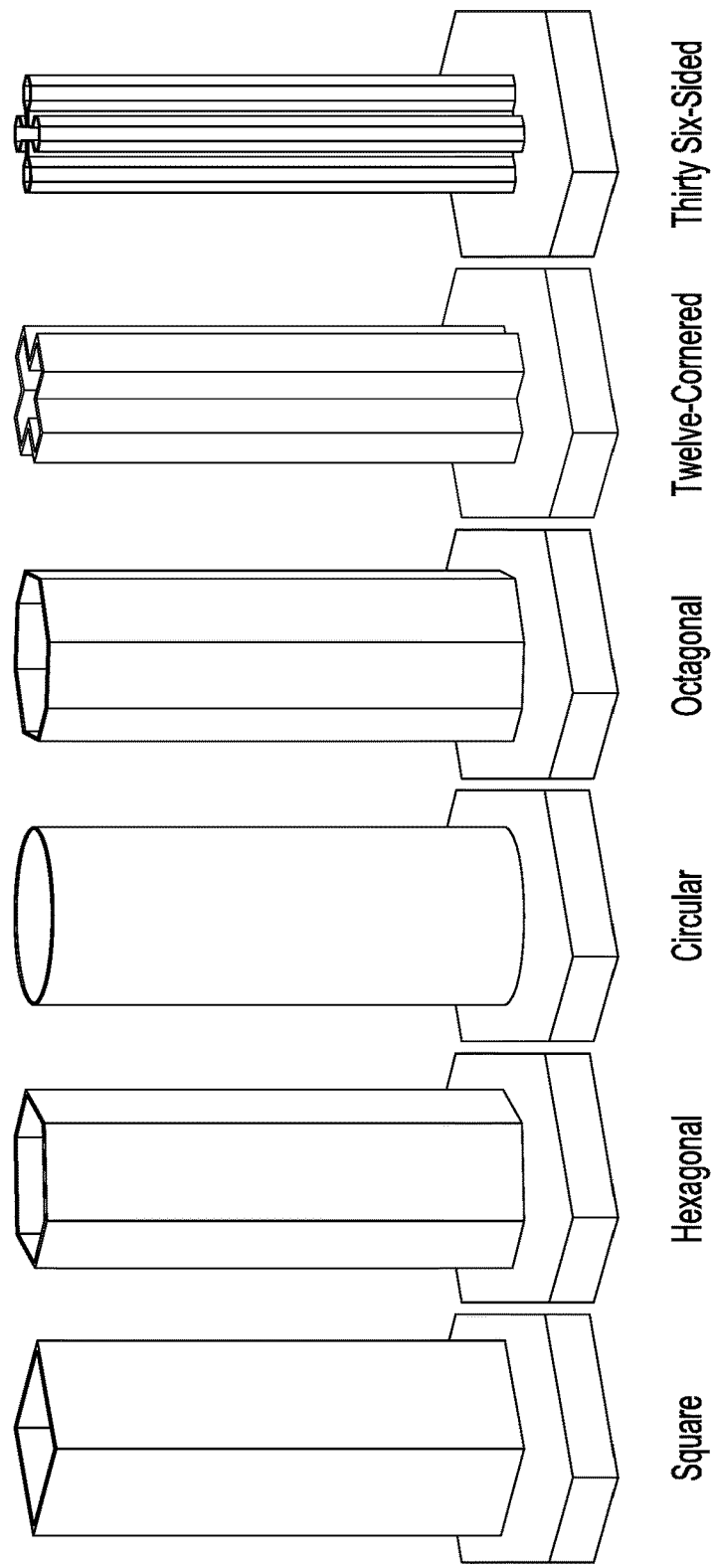

THIRTY-SIX CORNERED VEHICLE BEAM

TECHNICAL FIELD

This disclosure relates to beams in vehicles that provide improved reaction forces to counter crush loads.

BACKGROUND

Vehicle frames may include a variety of beams that make up structure of the vehicle. Cross beams may extend between longitudinal frame rails to provide sufficient resistance to side impacts. Pillars are beams that support the vehicle roof and resist crush loads. Bumper support beams extend between a vehicle frame and front or rear bumpers to absorb energy associated with front or rear impacts.

More stringent fuel and emissions standards have created the need to reduce the weight of vehicles. However, vehicle safety standards and ratings require strengthening of beams to increase absorption of energy and improve crash performance. Stronger lighter-weight materials have been incorporated in vehicles by primarily changing the materials of the beams. But changing to lightweight materials may not be sufficient to minimize weight and improve crash worthiness.

Under axial loading conditions, axial collapse of a strengthening member may proceed in a buckling mode that is initiated in a middle of the strengthening member before moving to a top of the strengthening member in a non-progressive manner. This may increase the variation in crash behaviors among replicate samples, and result in less impact energy being absorbed compared to a progressive collapse mode.

The present disclosure is directed to achieving fuel economy driven weight reduction in vehicle beams and structural walls while maximizing compressive strength and energy absorption during a crash. This disclosure is also directed to providing a consistent set of beams having various strengths and fewer variations of the outer dimensions.

SUMMARY

According to one embodiment of this disclosure, a vehicle frame is disclosed. The vehicle frame may include an extruded metal hollow columnar beam defining in cross section, four interconnected arms, each having nine sidewalls and a bulbous free end, arranged to form a cross with thirty-six corners, and configured to dissipate axial compression loads via deformation of the thirty-six sidewalls and the thirty-six corners.

According to another embodiment of this disclosure, a vehicle frame is disclosed. The vehicle frame may include an extruded metal hollow columnar beam defining in cross section, four interconnected arms, each having nine sidewalls and a tapered free end, arranged to form a cross with thirty-six corners, and configured to dissipate axial compression loads via deformation of the thirty-six sidewalls and the thirty-six corners.

According to yet another embodiment of this disclosure, a method for manufacturing a vehicle beam is disclosed. The method may include fabricating an inner portion comprised of a first set of walls and a second set of walls arranged orthogonally to the first set, fabricating an outer portion comprised of four nodules each including seven connected sidewalls, and joining the inner portion to the outer portion.

BRIEF DESCRIPTION OF THE DRAWINGS

FIG. 3 is a perspective view of various beams that have varying cross sections having substantially the same thickness, length, and perimeter.

DETAILED DESCRIPTION

Figure 1:
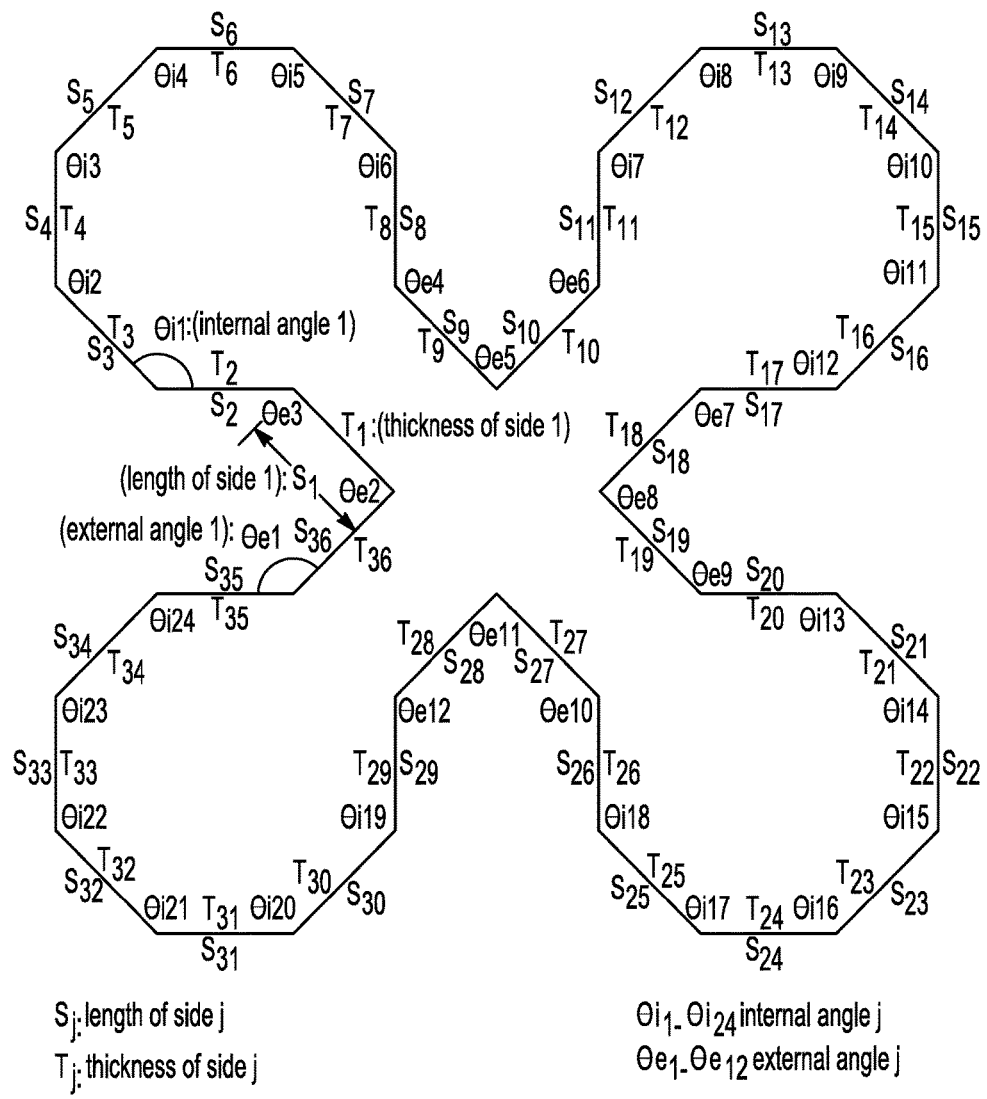
FIG. 1 is a cross-sectional view of an exemplary thirty-six-cornered beam having twenty-four internal angles and twelve external angles.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure describes a vehicle beam having thirty-six-corners to increase stiffness throughout the sides and corners without increasing thickness of the walls connecting the corners. The beam provides, for example, a variety of tunable parameters configured to increase strength (i.e., load carrying and energy absorption) over basic polygonal designs (e.g., polygonal strengthening member cross sections having less or the same number of sides), while also allowing design flexibility to meet various vehicle applications. The beam may absorb more energy and axially collapse in a more uniform manner, when front and side impact forces, among others, are exerted on the beam. The beam may also possess improved durability and noise-vibration-harshness (NVH) performance due to work hardening within the thirty-six corners. Furthermore, the lengths the sides, arrangement of them, or angles, or all three, of the present disclosure can achieve a similar, if not greater, strength increase, while minimizing mass per unit length of the member and maintaining a high manufacturing feasibility.

Conventional beams having basic polygonal cross sections, such as, square, rectangular, hexagonal and octagonal, etc., are generally used because they are easier to manufacture. Because strengthening members with multi-cornered cross sections in accordance with the present disclosure have substantially increased strength and stiffness without requiring thicker corner portions, they also have a higher manufacturing feasibility than previously-contemplated members that have thickened corners. While still providing a desired strength, a strengthening member in accordance with the present teachings can be formed in one or multiple sections by, for example, bending, rolling, cutting, forging, stamping, press forming, hydro-forming, molding, die casting, 3-D printing, and extrusion. Thus-formed sections can be joined via welding, adhesive, fastening, or other known joining technologies.

A beam can comprise, for example, steel alloys, aluminum alloys, magnesium alloys, titanium alloys, nylons, plastics, polymers, fiber-reinforced composites, silicone, semiconductor, papers, hybrid materials (e.g., multiple dissimilar materials), shape-memory materials, forms, gels or any other suitable materials. Those of ordinary skill in the art would understand that the material used for a strengthening member may be chosen as desired based on intended application, strength/weight considerations, cost, and other design factors.

The thirty-six-cornered beams may be implemented in other applications, including but not limited to, aircraft, space craft, marine vehicles, other primary movers, or building applications requiring a high-energy absorbing or lightweight structure, or both.

Referring to FIG. 1, a cross-sectional view of a thirty-six-cornered beam is illustrated. The beam comprises thirty-six sides having lengths $S_1$-$S_{36}$ and thicknesses $T_1$-$T_{36}$, twenty-four internal corners with angles $\theta i_1$-$\theta i_{24}$ and twelve external corners with angles $\theta e_1$-$\theta e_{12}$. The length, thickness, internal corner angles, and external corner angles can be varied (i.e., tuned) to achieve improved strength and other performance features (e.g., stability of folding pattern) compared to existing strengthening member cross sections. This strength improvement may further obviate the need for increased corner thickness, which is a benefit of fine-tuning the design parameters (e.g., side lengths, thicknesses, internal angles, and external angles) of a strengthening member having a thirty-six-sided (i.e., thirty-six-cornered) cross section.

Figure 2A:
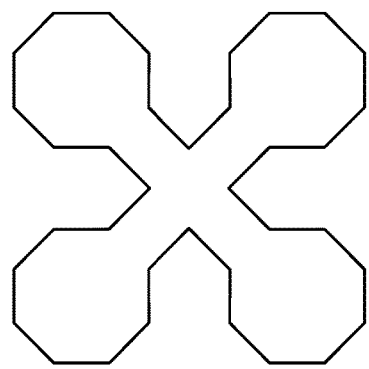
FIGS. 2A-2F illustrate how tunable parameters in accordance with the present disclosure can be utilized to modulate the cross section of FIG. 1.
Figure 2B:
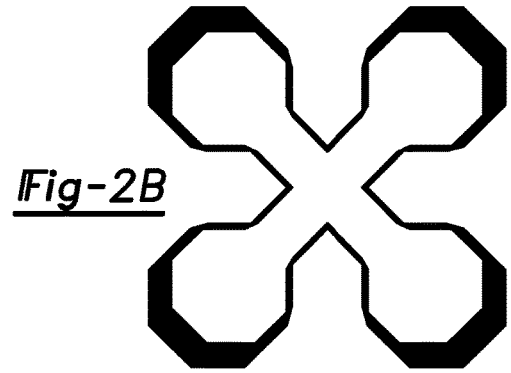
Figure 2C:
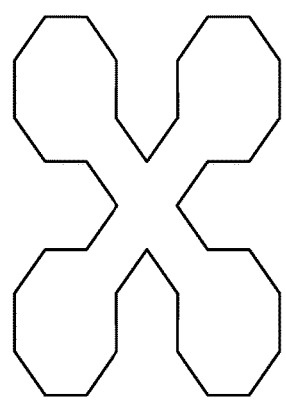
Figure 2D:
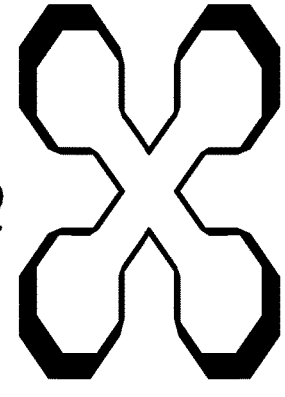
Figure 2E:
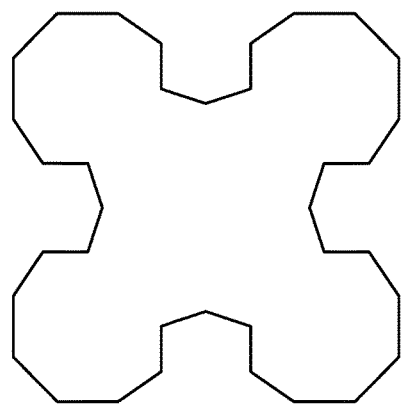
Figure 2F:
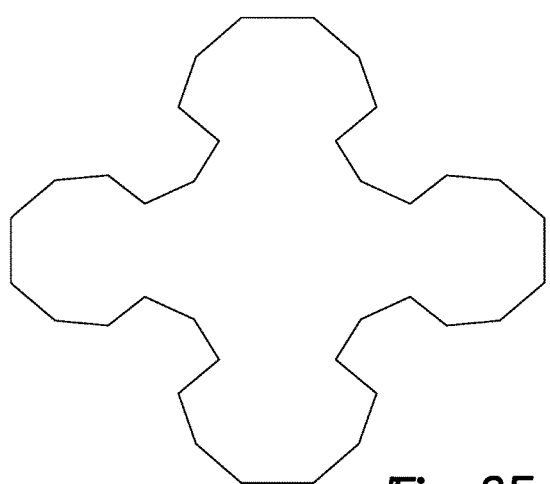

Referring to FIGS. 2A-2F, alternative examples of various configurations of the thirty-six-cornered beam, are illustrated. For instance, the lengths of the sides $S_1$-$S_{36}$ (see FIGS. 2C-2F) and thicknesses $T_1$-$T_{36}$ (see FIGS. 2B and 2D showing tapered sides) of the sides and the angles $\theta i_1$-$\theta i_{24}$ of the internal angles may be varied, as would be understood by one skilled in the art, to meet available packaging requirements within a vehicle. The length of each side may range from approximately 10 mm to approximately 250 mm. In other applications, e.g., aircraft, spacecraft, watercraft, high-speed rail vehicles, or building applications, a length of each side ($S_1$-$S_{36}$) may be larger. The thickness of the sides and corners can range from about 0.7 mm to about 6.0 mm; and in certain approaches, the thickness of the sides is substantially the same as the thickness of the corners. In other applications, such as in aircraft, spacecraft, watercraft, high-speed rail vehicles, or building applications, for example, the thickness of the side or sides may be greater. FIGS. 2A-2F are exemplary only, and are provided merely to illustrate how design parameters can be utilized to modulate the cross section of the exemplary approach of FIG. 1. For example, external angles $\theta e_1$-$\theta e_{12}$ may also be varied. Thus, the present disclosure contemplates various thirty-six-cornered cross section configurations having various shapes and dimensions (i.e., corner bend radii, side lengths, thicknesses, internal angles and/or external angles), which can be adjusted based on space requirements and/or to control member collapse modes.

In some configurations, each of the internal angles and the external angles are at least 45 degrees and are less than 180 degrees. For example, internal angles $\theta i_1$-$\theta i_{24}$ may range from approximately 90 degrees to about 170 degrees, and external angles $\theta e_1$-$\theta e_{12}$ may range from about 45 degrees to approximately 170 degrees. In one approach, certain internal angles (e.g., $\theta i_2$, $\theta i_3$, $\theta i_4$, $\theta i_5$, $\theta i_6$, $\theta i_8$, $\theta i_9$, $\theta i_{10}$, $\theta i_{11}$, $\theta i_{14}$, $\theta i_{15}$ $\theta i_{16}$, $\theta i_{17}$, $\theta i_{20}$, $\theta i_{21}$, $\theta i_{22}$, and $\theta i_{23}$) may be approximately 160 degrees, and other internal angles (e.g., $\theta i_1$, $\theta i_7$, $\theta i_{12}$, $\theta i_{13}$, $\theta i_{18}$, $\theta i_{19}$, and $\theta i_{24}$) may be less than 160 degrees (e.g., approximately 135 degrees).

The thirty-six-cornered beam defines a plurality of nodules disposed about the perimeter of the beam. Note that "nodule" means a group of closely grouped members, e.g., side members, that are disposed in close proximity to one another such that they are distinct from their surroundings. The nodules may be referred to as a bulbous end, meaning a larger, or round, or bulging end. The sides $S_1$-$S_{36}$, the internal angles $\theta i_1$-$\theta i_{24}$, and external angles $\theta e_1$-$\theta e_{12}$, define each of the nodules. For example, as shown in FIG. 1, sides $S_2$-$S_8$ may define internal angles $\theta i_1$-$\theta i_6$ and external angles $\theta e_3$ and $\theta e_4$ to define a first nodule. Sides $S_{11}$-$S_{17}$ define internal angles $\theta i_7$-$\theta i_{12}$ and external angles $\theta e_6$ and $\theta e_7$ to define a second nodule. Sides $S_{20}$-$S_{26}$ may form internal angles $\theta i_{13}$-$\theta i_{18}$ and external angles $\theta e_9$ and $\theta e_{10}$ to define a third nodule. Sides $S_{29}$-$S_{35}$ may form internal angles $\theta i_{19}$-$\theta i_{24}$ and external angles $\theta e_1$ and $\theta e_{12}$ to define the fourth nodule. So, individual nodules of the plurality of nodules may include six internal angles and two external angles defined by nine sides. The individual nodules may be connected to adjacent individual nodules to form external angles $\theta e_2$, $\theta e_5$, $\theta e_8$, and $\theta e_{11}$ therebetween. Although four nodules are described herein, other combinations of sides and internal angles may result in more or less nodules.

The individual nodules of the plurality of nodules may include a first side wall, e.g., distal sidewall $S_4$ that extend in a plane that is parallel to a first axis and two side walls $S_2$ and $S_6$ extending in a plane that is parallel to a second axis and orthogonal to the first axis. Side walls $S_2$, $S_3$, $S_5$, $S_6$, and $S_7$ extend in planes disposed at a non-zero angle relative to the first axis. For example, the non-zero angle may be approximately 45 to 90 degrees. The angled side walls may define a first set of parallel walls $S_2$, $S_6$, $S_{13}$, $S_{17}$, $S_{20}$, $S_{24}$, $S_{31}$, and $S_{35}$ that extend perpendicular to the first set of parallel walls.

Individual nodules of the plurality of nodules may be separated by one or more external angles. In one approach, an individual nodule may be separated from an adjacent nodule by one external angle. Referring to FIG. 1, external angle $\theta e_5$ (defined by sides $S_9$ and $S_{10}$) may separate a first nodule from a second nodule. Thus, the individual nodule may be separated by only external angles, with no internal angles disposed therebetween. In still other approaches, the cross section may be provided with internal angles between adjacent nodules.

The nodules may be disposed about a central axis of the strengthening member around the perimeter of the strengthening member. In one approach, shown for example in FIGS. 2A, 2B, and 2E side walls of the lobes are evenly spaced about the central axis. In another approach, shown in FIG. 2C and FIG. 2D, side walls of the nodules may be unevenly spaced about the central axis. In this approach, the cross section of the strengthening member may be provided with a 10/7 aspect ratio, as compared to the cross sections of FIGS. 2A, 2B, 2D, 2E, and 2F. As shown in FIG. 2C, a first side wall of a first nodule may be spaced a first distance from a second side wall of a second nodule adjacent to the first nodule along the perimeter. A third side wall of the first nodule may be spaced a second distance from a fourth side wall of a third nodule adjacent to the first nodule along the perimeter. In this approach, the first and second distances have different lengths. For example, the first distance may be greater than the second distance.

In comparing crash energy absorption of strengthening members of varying shapes having the same thickness and perimeter, as illustrated in FIG. 3, for example for an impact with a rigid wall at 35 mph, a thirty-six-cornered cross section in accordance with the present disclosure may result in a shorter crush distance and smaller folding length. The thirty-six-cornered cross section may also provide improved axial collapse stability and improved crash energy absorption. For example, a thirty-six-cornered cross section in accordance with the present disclosure may achieve about a 100-150% increase in crash energy absorption over a square cross section and a 90-115% increase in crash energy absorption over hexagonal and octagonal cross sections.

To demonstrate the improved strength and performance features of a thirty-six-cornered cross section in accordance with the present disclosure compared to various existing cross section designs, exemplary strengthening members were modeled and experimental test runs were conducted, as shown and described below with reference to FIGS. 3-7.

Figure 4:
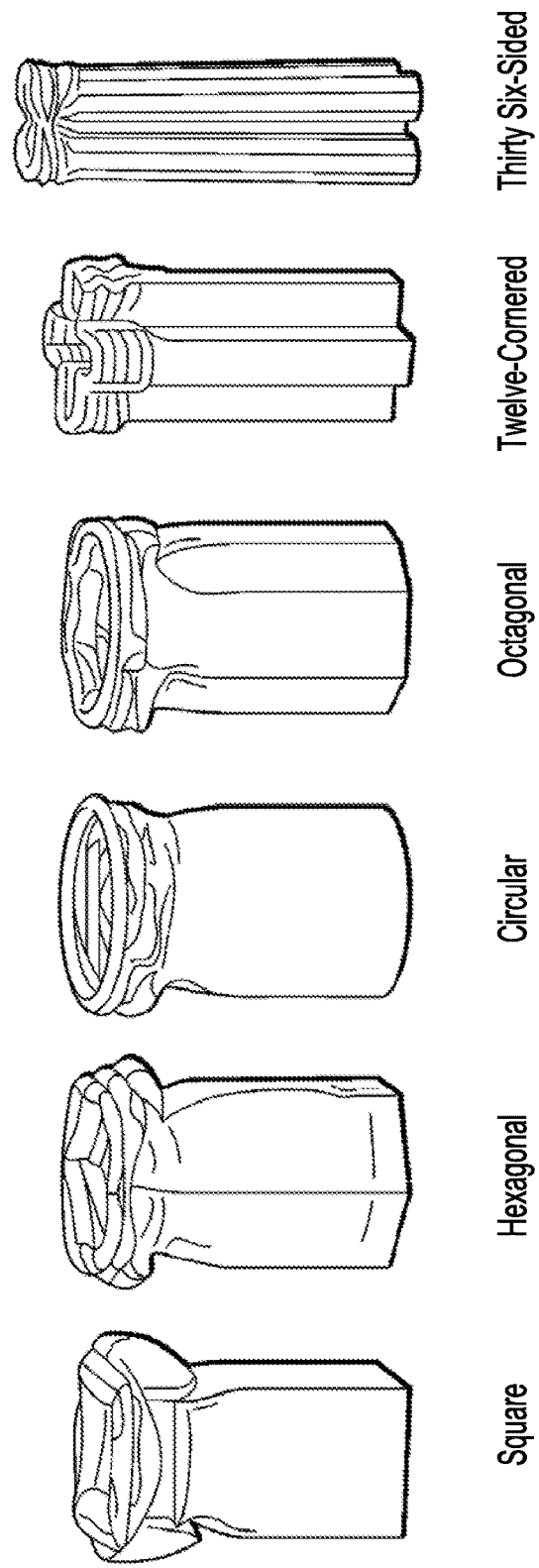
FIG. 4 illustrates an exemplary axial collapse of the beams shown in FIG. 3.
Figure 5:
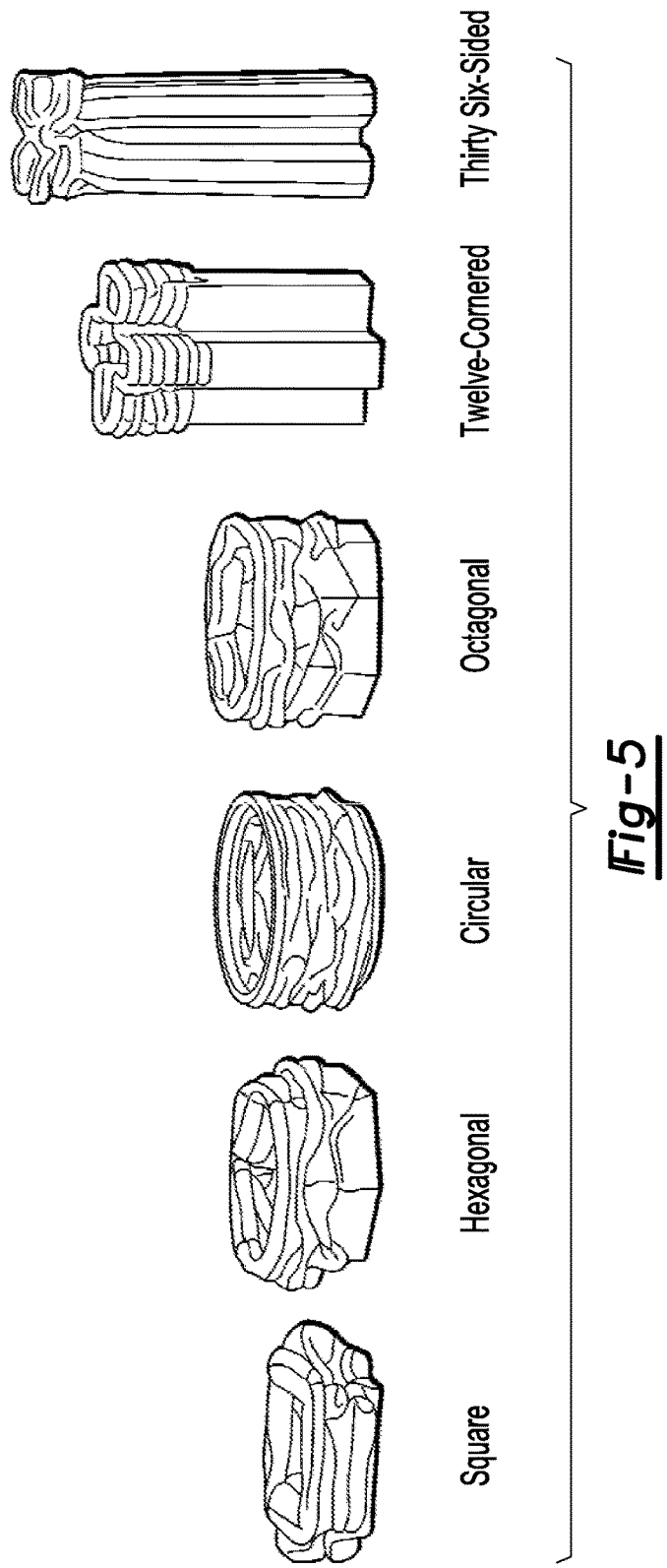
FIG. 5 illustrates an exemplary dynamic crush force of the beams shown in FIG. 3.

Strengthening members of varying shapes (i.e., cross sections) having the same thickness, length and perimeter (e.g., each part having a mass of about 1.22 Kg) were modeled as illustrated in FIG. 3. Tests were then run for each member to simulate an impact with the same rigid mass (e.g. an impactor), impact speed, and initial kinetic energy. As shown in FIG. 4, the thirty-six-cornered cross section in accordance with the present disclosure demonstrated the most stable axial collapse and the highest crash energy absorption. Furthermore, as shown in FIG. 5, the thirty-six-cornered cross section in accordance with the present disclosure also demonstrated the shortest crush distance and smallest folding length.

Figure 6:
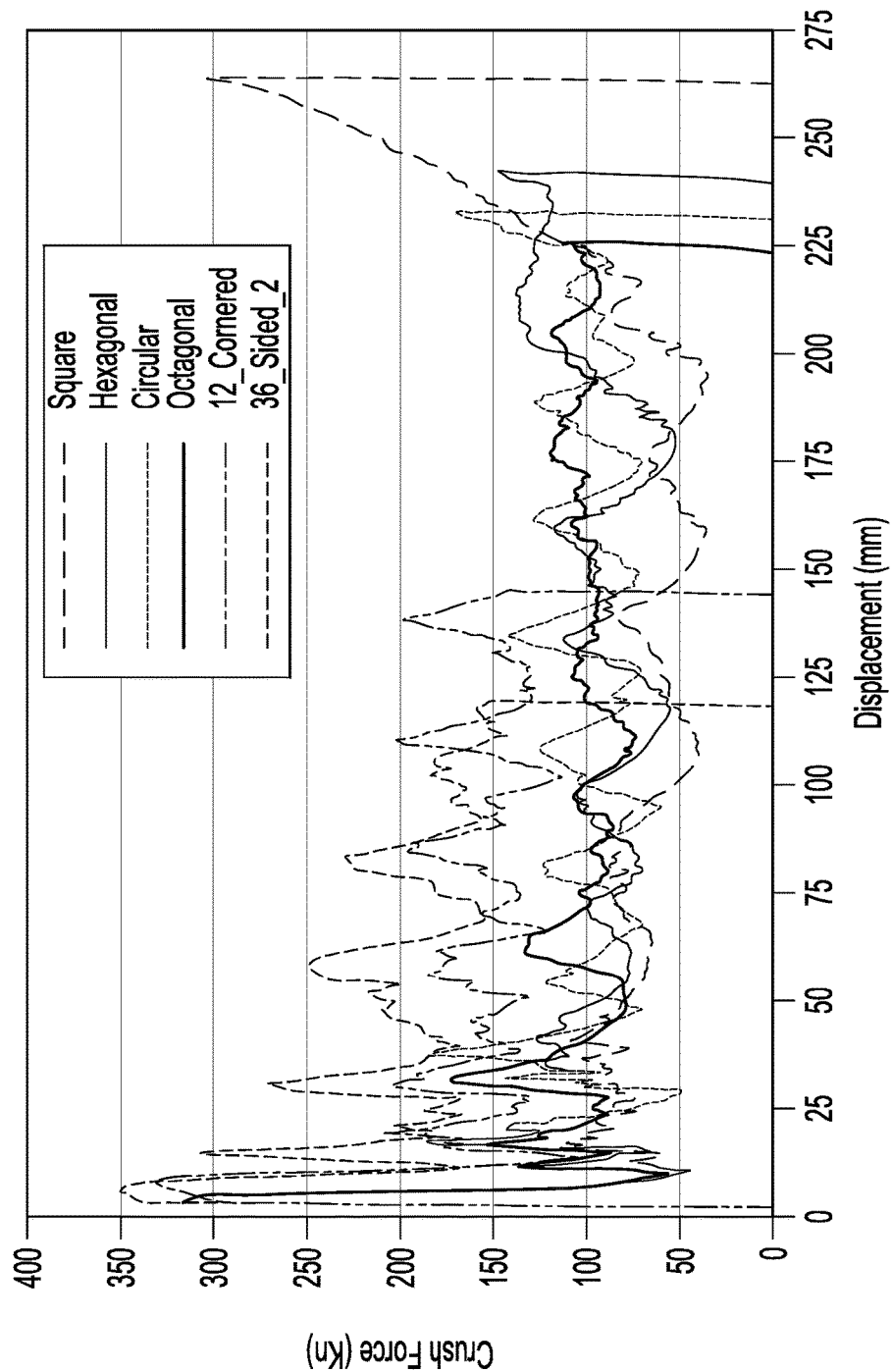
FIG. 6 is a graph comparing dynamic crush force of the beams shown in FIG. 3.

FIG. 6 illustrates the crush force (in kN) and associated axial crush distance (in mm) for the simulated impact, exerted axially on the exemplary strengthening members having the cross sections shown in FIG. 3. As shown in FIG. 6, the strengthening member having a thirty-six-cornered cross section could sustain a much higher crushing force for a given resulting crushing distance as compared with the square, hexagonal, circular and octagonal cross sections. This allows improved impact energy management while minimizing mass per unit length.

Figure 7:
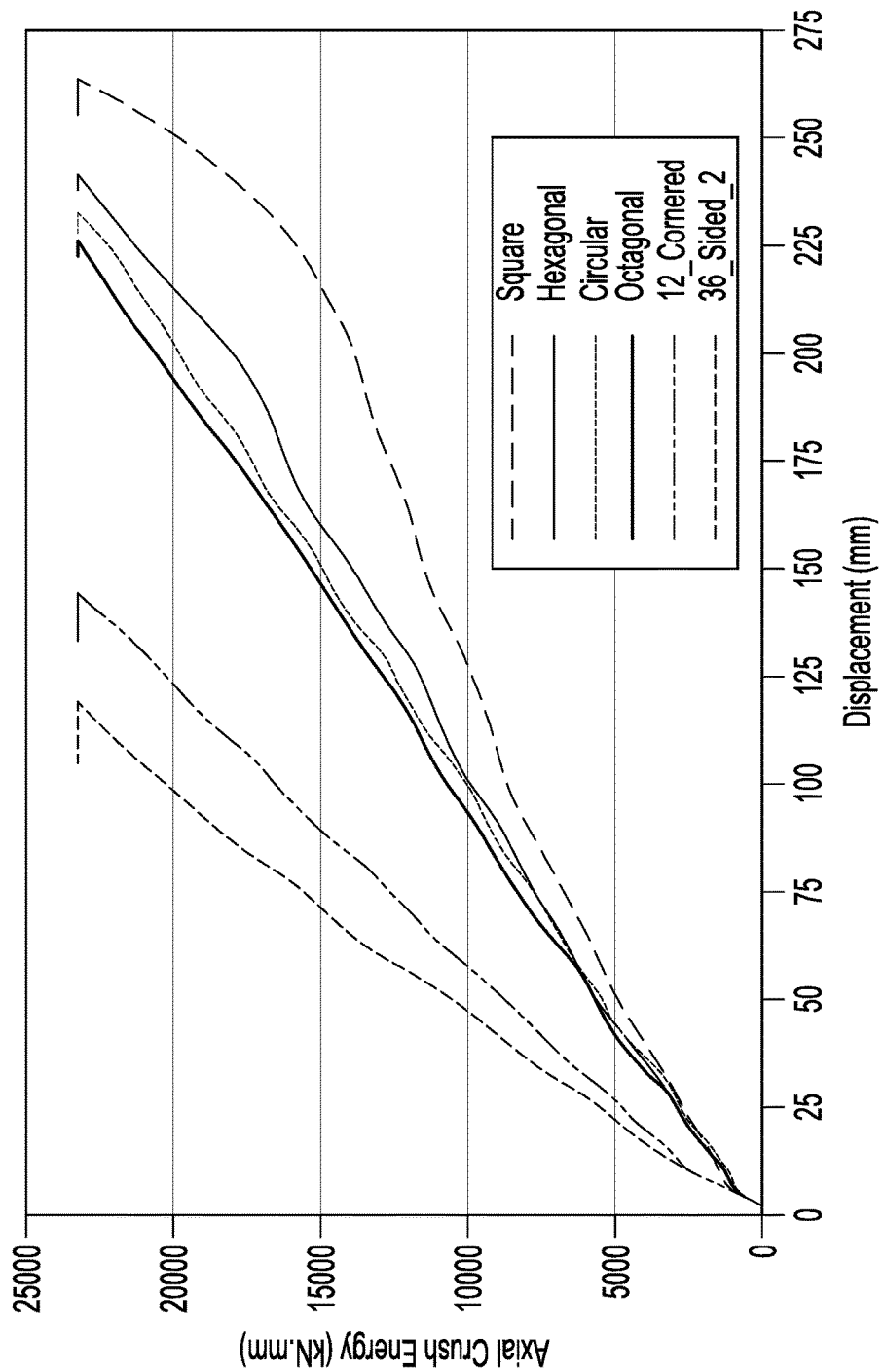
FIG. 7 is a graph comparing crush energy absorption of the beams shown in FIG. 3.

FIG. 7 illustrates the axial crush energy (in kN-mm) and associated axial crush distance (in mm) for the exemplary strengthening members having the cross sections shown in FIG. 3. As shown in FIG. 7, the strengthening member having a thirty-six-cornered cross section could absorb the total kinetic energy of the impact (i.e., 22,983 kN-mm) over a much shorter distance as compared with the square, hexagonal, circular and octagonal cross sections.

Figure 8A:
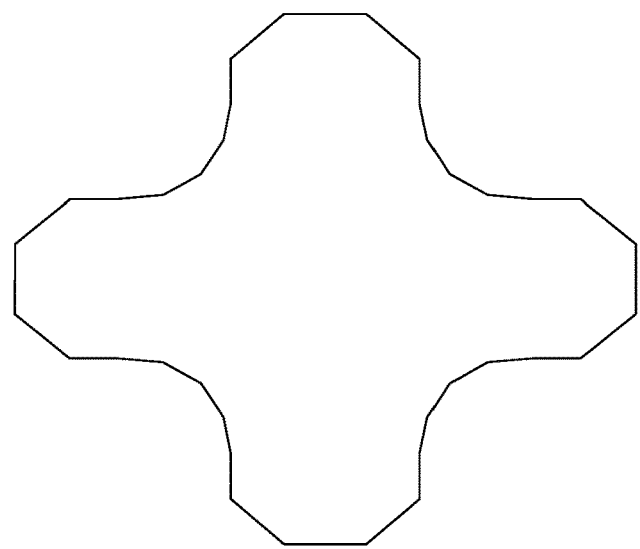
FIGS. 8A and 8B illustrate how the walls of the vehicle beam may be altered to tune the vehicle beam with improved moisture shedding capabilities.
Figure 8B:
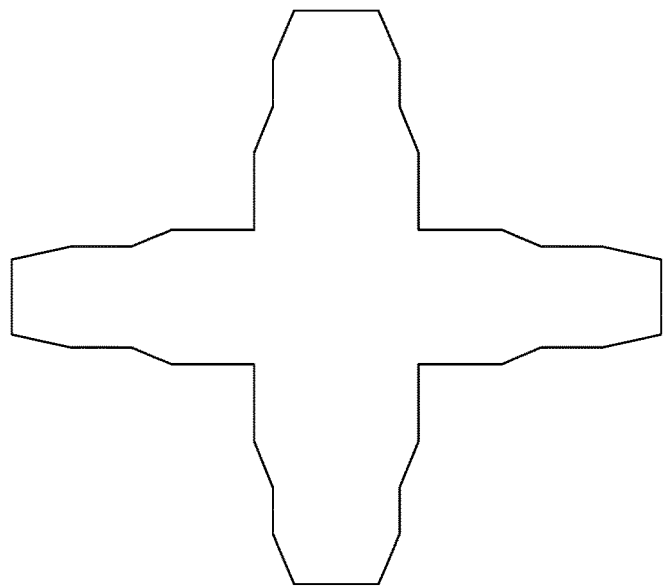

Referring to FIGS. 8A and 8B, thirty-six-cornered beams according to one or more embodiments of this disclosure are illustrated. In the approaches of FIGS. 8A and 8C, the thirty-six-cornered cross section defines twenty-four internal angles and twelve external angles. As shown, the twenty-four internal angles may be greater than 90 degrees. In the approach shown in FIG. 8A, certain external angles (e.g., eight external angles) may be greater than 90 degrees (e.g., 135 degrees), and certain other external angles (e.g., four external angles) may be approximately 90 degrees. In the approach shown in FIG. 8B, all external angles are greater than 90 degrees. For example, certain external angles (e.g., eight external angles) may be approximately 135 degrees, and certain other external angles (e.g., four external angles) may be approximately 110-115 degrees. The strengthening member may define a continuous taper along a substantial length of the strengthening member from a first end of the strengthening member to a second end of the strengthening member.

In many approaches, the strengthening member may be disposed at an exterior of a vehicle, and therefore may be exposed to moisture and other elements such as rain, snow, salt, mud, etc. Such elements may cause corrosion problems, particularly, for example, in accumulation regions such as recesses or indentations. The strengthening members according to FIGS. 8A and 8B may provide improved moisture shedding as compared to known strengthening members. For example, increasing the external angles to greater than 90 degrees increases the contact angle of moisture contacting the strengthening member at the external angle, thereby increasing the hydrophobicity of the strengthening member at the external angle. In this way, a strengthening member (e.g., a strengthening member disposed at an exterior of a vehicle) that may be exposed to moisture may be provided with improved moisture shedding capabilities.

A method for manufacturing a strengthening member for an automotive vehicle may include fabricating two or more sections of the strengthening member. Fabricating the two or more sections may include stamping, press forming, roll forming, hydroforming, molding, casting, machining, forging, 3-D printing, and/or extruding each of the two or more sections.

The method may further include joining the two or more sections to form the strengthening member having the thirty-six-cornered cross section. The two or more sections may be joined by one or more of welding, adhesion, and fastening. The thirty-six-cornered cross section includes twenty-four internal angles and twelve external angles disposed between thirty-six sides. Each of the internal angles and the external angles are at least 45 degrees and are less than 180 degrees.

Thirty-six-cornered cross sections in accordance with the present disclosure may, therefore, allow improved impact energy management over, for example, basic polygonal strengthening member cross sections, including basic twenty-sided polygonal cross sections, while minimizing mass per unit length.

Thus, as illustrated, strengthening members in accordance with the present disclosure are configured to achieve strength increases (i.e., load carrying and energy absorption) over basic polygonal designs (including polygonal strengthening member cross sections having the same number of sides), while also permitting flexibility in design to better meet vehicle space requirements. Such strengthening members may, therefore, be used to replace existing strengthening member cross section designs (both traditional and non-traditional).

Various exemplary approaches of the present disclosure contemplate, for example, strengthening members with corners having different bend radii, with non-uniform cross sections (e.g., having non-symmetrical shapes), and/or with sides having variable thicknesses (i.e., having tapered sides). Various additional exemplary approaches contemplate strengthening members that are bent and/or curved. Moreover, to further adjust a member's folding pattern and/or peak load capacity, various additional exemplary approaches also contemplate strengthening members having trigger holes, flanges, and/or convolutions as would be understood by those of ordinary skill in the art.

Furthermore, multi-cornered strengthening members in accordance with the present disclosure are contemplated for use with a number of structural members, such as, for example, crush cans, front rails, mid-rails, rear rails, side rails, shotguns, cross members, roof structures, beltline tubes, door beams, pillars, internal reinforcements, and other components that can benefit from increased crash energy absorption. In addition, such strengthening members can be applied to both body-on-frame and unitized vehicles, or other types of structures. Thus, depending on application, strengthening members may have varied shapes (i.e., various cross sections) to accommodate specific member space constraints. When used as a vehicle front rail, for example, to achieve optimized axial crush performance, the lengths and thicknesses of the sides and/or angles of the corners can all be adjusted (tuned) to provide optimal strength, size and shape to meet engine compartment constraints.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle frame comprising:
   an extruded metal hollow columnar beam
      defining, in cross section, four interconnected arms, each having nine sidewalls and a bulbous free end, arranged to form a cross with thirty-six corners, and
      configured to dissipate axial compression loads via deformation of the thirty-six sidewalls and the thirty-six corners.

2. The vehicle frame of claim 1, wherein the bulbous free ends are heptagonally shaped.

3. The vehicle frame of claim 1, wherein at least two of the nine sidewalls are parallel to one another.

4. The vehicle frame of claim 3, wherein two of the nine sidewalls are positioned adjacent to one another and arranged orthogonal to one another.

5. The vehicle frame of claim 1, wherein the four interconnected arms have a same size and a same shape.

6. The vehicle frame of claim 1, wherein at least one of the bulbous free ends includes at least one sidewall that has a thickness greater than a thickness of the other sidewalls.

7. The vehicle frame of claim 1, wherein the extruded metal hollow columnar beam defines a center point and wherein at least one of the bulbous free ends includes a first set of sidewalls and a second set of sidewalls, wherein the first set of sidewalls is positioned further away from the center point than the second set of sidewalls, and wherein the first set of sidewalls have a thickness greater than the second set of sidewalls.

8. The vehicle frame of claim 1, wherein each of the bulbous free ends includes at least one wall extending along a plane parallel to a first axis, at least one wall extending in a plane parallel to a second axis, orthogonal to the first axis, and four walls arranged along a non-zero angle relative to the first axis.

9. The vehicle frame of claim 1, wherein the extruded metal hollow columnar beam defines twenty-four internal angles and twelve external angles.

10. A strengthening member comprising:
    an extruded hollow columnar beam
       defining, in cross section, four interconnected arms, each having nine sidewalls and a tapered free end, arranged to form a cross with thirty-six corners, and
       configured to dissipate axial compression loads via deformation of the thirty-six sidewalls and the thirty-six corners.

11. The strengthening member of claim 10, wherein the extruded metal hollow columnar beam further defines, in cross section, an axis, wherein the tapered free end includes a first set of sidewalls, a second set of sidewalls, and a distal sidewall, and wherein the first set of sidewalls are arranged orthogonal to the axis and the second set of sidewalls connect the first set of sidewalls to the distal sidewall.

12. The strengthening member of claim 11, wherein the first set of sidewalls are arranged parallel to one another.

13. The strengthening member of claim 11, wherein the first set of sidewalls includes a first subset of sidewalls and a second subset of sidewalls, and wherein the first subset of sidewalls are spaced apart from one another by a first distance and the second subset of sidewalls are spaced apart by a second distance less than the first.

14. The strengthening member of claim 13, wherein the distal sidewall has a length that extends a third distance, less than the second distance.

15. The strengthening member of claim 14, wherein the distal sidewall has a thickness that is greater than a thickness of the first set of sidewalls.

16. The strengthening member of claim 10, wherein the four interconnected arms have a same size and a same shape.

17. A method for manufacturing a vehicle beam comprising:
    fabricating an inner portion comprised of a first set of walls and a second set of walls arranged orthogonally to the first set;
    fabricating an outer portion comprised of four nodules each including seven connected sidewalls; and
    joining the inner portion to the outer portion.

18. The method of claim 17, wherein fabricating the inner portion includes extruding the first and second sets of walls.

19. The method of claim 17, wherein fabricating the outer portion includes extruding the seven connected sidewalls.

20. The method of claim 17, wherein joining the two or more sections includes joining the two or more sections by one or more of welding, adhesion, and fastening.

* * * * *